Patented Apr. 22, 1930

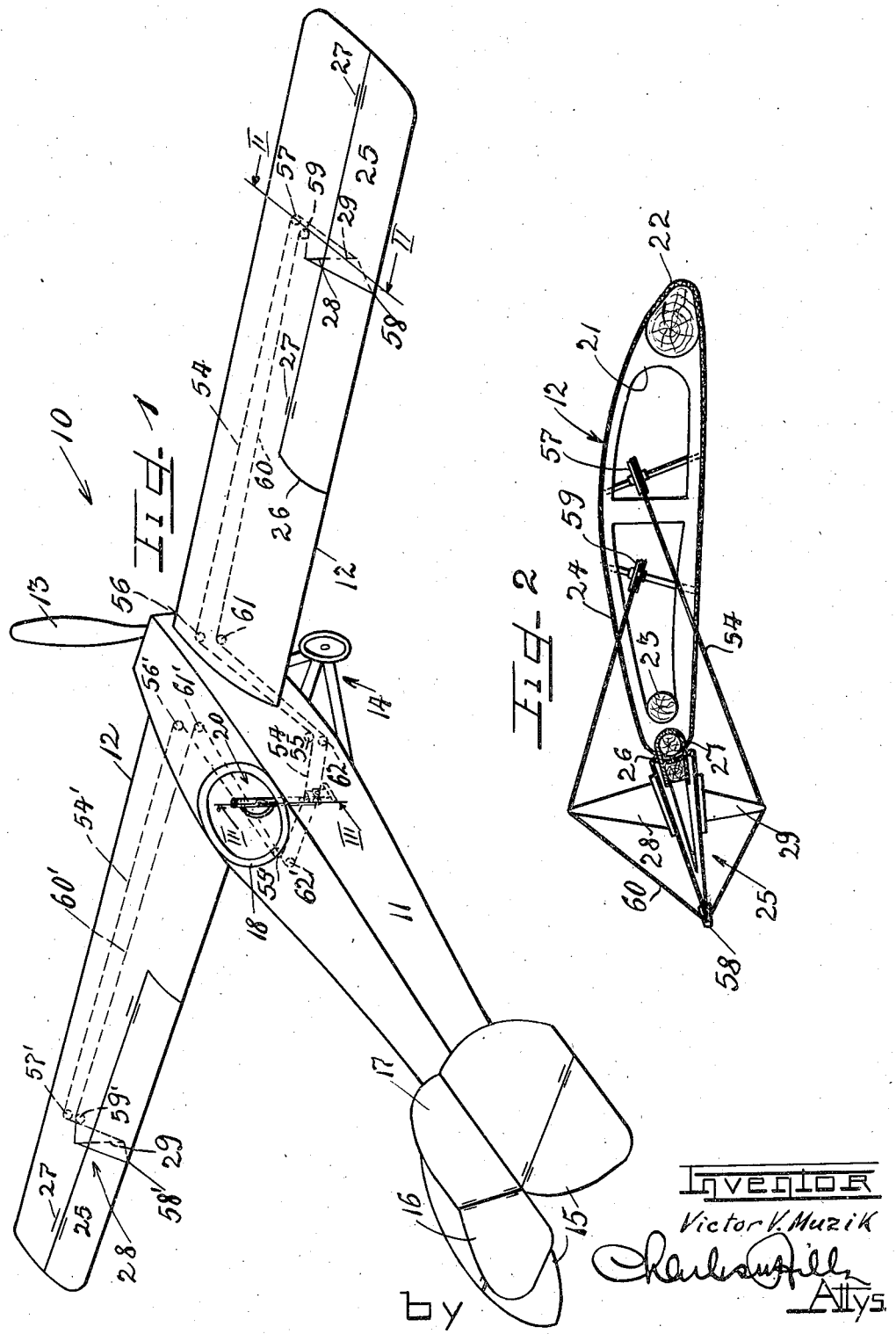

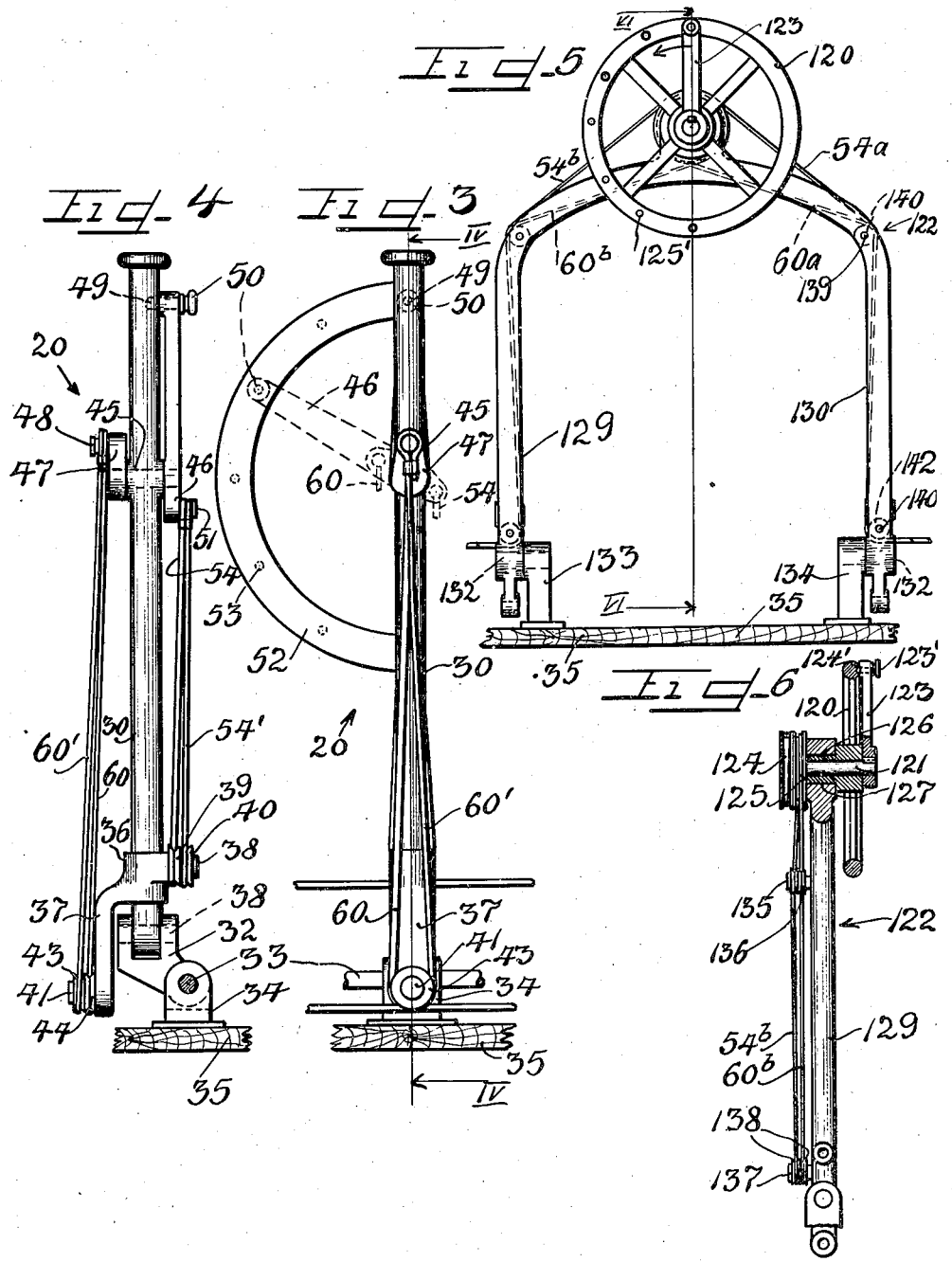

1,755,889

UNITED STATES PATENT OFFICE

VICTOR V. MUZIK, OF CHICAGO, ILLINOIS

AEROPLANE-CONTROL MECHANISM

Application filed August 31, 1927. Serial No. 216,526.

My invention relates to aeroplane control mechanism, and more particularly to control means for adjusting the ailerons of the plane so as to vary their positions relative to the wings and to thus vary the angle of incidence of each of said wings.

Now it is well known in aeroplane practice that the lifting power of the plane may be increased by either increasing the angle of incidence of the wings, or by accelerating the speed of the plane through the air. In the past, a number of attempts have been made to produce a plane wherein the angle of incidence of its wings could be efficiently adjusted while the plane is in operation. For example, I am aware that this adjustment has been attempted by providing means for varying the position of the wings of the plane relative to the fuselage. This particular adjustment, however, has not met with success due to the fact that it involved a complete deviation from the present practice, and inasmuch as it involved expensive additions to the plane which materially increased the cost of manufacture. Then, too, as a result of the additional mechanism added to the fuselage for adjustably carrying the wings, the weight of the plane was increased to a considerable degree and obviously its efficiency was proportionately lowered.

I propose to accomplish the desired end of increasing the lift of the wings by doing two things: Firstly, by providing auxiliary control means for varying the position of each of the ailerons of the plane whereby the angle of incidence of each wing is varied, and, secondly, by providing an auxiliary control which may be readily associated with either the stick or wheel type of control without any substantial change in the conventional control, and which will operate the ailerons through the internal wiring employed for banking the plane.

It will, therefore, be evident that the principal object of my invention is to provide an efficient auxiliary control for contemporaneously acting upon the two ailerons of the plane through the internal wiring employed for banking the plane and to thus vary the angle of incidence of the wings of the plane so as to enable the lifting power of the plane to be increased without any corresponding acceleration in its speed.

In accordance with the general features of my invention, there is provided an auxiliary control member coupled to either the stick or wheel control of the plane adapted to normally move with the control, but also being capable of independent movement when it is desired to vary the position of the ailerons in order to change the angle of incidence of the wings.

Another feature of the invention resides in the arrangement of auxiliary pulleys associated with the auxiliary control, whereby the internal wiring employed to bank the plane is operatively associated with the auxiliary control without at the same time interfering with or impeding the connection of this wiring to the principal control member.

Other objects and advantages of my invention will more fully appear from the following detailed description taken in connection with the accompanying drawings, which illustrate several embodiments thereof and in which:

Figure 1 is a perspective view of a monoplane having control mechanism embodying the features of the present invention;

Figure 2 is a cross-sectional view taken transversely through one of the wings of the plane illustrating the wiring for one of the ailerons;

Figure 3 is a fragmentary view partly in section taken on substantially the line III—III of Figure 1 illustrating a control stick provided with my novel auxiliary control;

Figure 4 is a side view of the control stick shown in Figure 3 taken on the line IV—IV of Figure 3 looking in the direction indicated by the arrows;

Figure 5 is a fragmentary view partly in section illustrating my invention as applied to the wheel type control, and Figure 6 is a sectional view taken on substantially the line VI—VI of Figure 5 looking in the direction indicated by the arrows.

In the drawings:

Like reference characters designate similar parts throughout the several views.

The reference character 10 designates generally a monoplane which, with the exception of the joy stick control and the associated wiring for operating the ailerons, is of a conventional construction. Of course, it is to be understood at the outset that although I have illustrated my invention as applied to a monoplane, still the invention is not to be thus limited inasmuch as it can be applied with equal advantage to other types of aeroplanes. The monoplane illustrated in Figure 1 includes a fuselage or body 11, lateral wings or planes 12—12, a propeller 13, landing gear 14, elevators 15, a rudder 16 and a vertical stabilizer 17. The fuselage 11 is provided with a pilot's station or cockpit 18 in which is disposed a joy stick or stick control 20 embodying the features of this invention.

Each wing 12, as shown in Figure 2, is made up of a plurality of conventional ribs 21 inter-connected by spars 22 and 23 and provided with a suitable covering 24. Also each wing, as is well known in the art, has hingedly connected to it an aileron 25. Each of these ailerons although slightly longer than the conventional aileron is of substantially the same construction as the conventional aileron. Each wing is provided with a cut out portion 26 in which the aileron is disposed. The aileron is hingedly connected to its associated wing, as indicated at 27. I purposely make the ailerons 25 longer than the standard type of aileron so as to increase the air surface afforded by them. Each aileron 25 is provided with an upwardly extending arm 28 and a downwardly extending arm 29 cooperable with the internal wiring to be hereinafter described. It will, of course, be understood that each of the wings is provided with a plurality of guides, thimbles and pulleys for accommodating the internal wiring, as is well known in the prior art.

The control stick (Figures 3 and 4) comprises a vertical rod 30 pivotally mounted at its lower end upon a pin 31 carried by a swivel member 32. The swivel member is in turn pivotally mounted upon a pin 33 carried by the spaced arms of a U-shaped bracket 34 secured to the floorboard 35 in the cockpit 18. The pin 33 may be connected by any conventional mechanism to the rudder of the plane. The lower end of the rod 30 has secured to it adjacent its pivotal mounting a collar member 36 having formed integral with it a downwardly extending arm 37 and a lateral pin 38. The pin 38 has rotatably mounted upon it a pair of pulleys 39 and 40. The lower end of the arm 37 has secured to it a pin 41 upon which is rotatably mounted a pair of pulleys 43 and 44. An intermediate portion of the rod 30 has extending through it a rotatable pin 45 upon the ends of which is mounted a pair of arms 46 and 47. The arm 47 has secured to it an anchor pin 48 to which the ends of the wires are secured, as will be more fully explained later. The arm 46 extends downwardly alongside of the rod 30 and carries at its upper end a spring-urged plunger 50 normally engaged in an opening 49 in the upper end of the rod 30. Also it will be noted that the arm 46 has secured to a lower portion thereof a pin 51 to which ends of the wires are also secured. The pin 51 is located below the pivot pin 45, whereas the pin 48 is located above the pivot pin 45. Movement of the arm 46 results in a movement of pivot pin 45 and the arm 47 inasmuch as these three parts are all secured together.

The upper end of the rod 30 has secured to it a quadrant 52 provided with a plurality of holes or apertures 53 in which the spring-urged plunger is adapted to engage. These holes 53 are spaced from each other and enable the arm 46 to be maintained in the adjusted position to which it is moved. In Figure 3 I have illustrated by dotted lines one of the adjusted positions to which the arm 46 may be moved. The arm 46 in reality constitutes an auxiliary control for operating the ailerons. I shall now proceed to describe the wiring between the control stick and the ailerons.

One end 54 of a wire cable 55 is secured to pin 51 on arm 46. This cable extends downwardly alongside of rod 30 and over pulley 39 in a direction toward the right aileron 25 shown in Figure 1. After leaving the cockpit 18, the wire 54 is threaded over pulleys 55 and 56 carried by the fuselage. The pulley 56 is disposed in alignment with a pulley 57 carried by an intermediate portion of the wing and supported in one of the ribs 21 thereof. The cable 54 is threaded from the pulley 56 over the pulley 57 and to the lower arm 29 on the right aileron 25. This cable 54 frictionally engages the end of the arm 29 and is then extended to a point 58 on the edge of the aileron (Figure 2). The cable 54 is suitably anchored to the aileron at point 58. A cable 60 is also secured to the aileron at point 58 and is extended upwardly over the top edge of arm 28 and down into the wing. It is, of course, to be understood, as is well known in the art, that suitable openings are provided for the wires to enter and leave the wings 12. The wire 60 is threaded over a pulley 59 disposed in the interior of the wing adjacent the pulley 57 and then is extended toward the fuselage 11. The wire cable 60 is disposed alongside of the cable 54 in the right wing of the plane and is then led over a pair of pulleys 61 and 62 in the fuselage. Pulley 61 is disposed in substantial alignment with the pulley 59. After leaving pulley 62, the wire cable 60 is threaded over pulley 44 and upwardly alongside of the rod 30 (Figure 4), The other end of this wire 60 is anchored to the pin 48 carried by arm 47.

Also connected to the joy stick 20 is a pair of wire cables 54' and 60' which are connected to the aileron 25 of the left wing 12 in the same manner as the cables 54 and 60 were connected to the aileron of the right wing. The cable 54' is anchored at one end to pin 51 and extends over pulleys 40 (Figure 4) 55', 56' and 57', over the end of arm 29 of the left aileron and is anchored at its other end at point 58' on the aileron. One end of the wire cable 60' is anchored at point 58 to the aileron and extends upwardly over the end of arm 28. Thereafter the line 60' is threaded over pulleys 59', 61', 62' and 43. After leaving pulley 43 (Figure 4), the wire 60' is led up alongside of rod 30 and is anchored at its other end to pin 48.

The operation of this form of the invention is briefly as follows. When the aviator desires to bank the monoplane shown in Figure 1, he moves the joy stick 20 about the pivot pin 31 in a direction which will cause one wing to be tilted upwardly and the other wing to be tilted downwardly so as to enable the plane to turn in the direction desired. If the aviator moves the joy stick, as shown in Figure 3, to the left, it will result in the wire 54 being pulled and the wire 54' being slackened. It will also result in the wire 60 being slackened and the wire 60' being pulled. Obviously this will result in the right aileron being lowered and the left aileron 25 being raised. This means that the right wing will present more surface to the air than the left wing and, hence, will be moved upwardly, causing the plane to turn to the left. The reverse of the above action is true if the joy stick is moved to the right by the aviator. During this movement of the joy stick, it must, of course, be remembered that the arm 46 moves with the rod 30 as a unit.

In the event that the aviator desires to augment the lift of the wings, he may do so by moving the arm 46 to the dotted position shown in Figure 3. This movement of the arm 46 causes both of the wire lines 54 and 54' to be slackened. It also results in a pull being exerted upon both of the wire lines 60 and 60', which will pull causes the two ailerons 25—25 to be lowered. The degree to which the ailerons are lowered depends upon the degree of movement of arm 46. Obviously the further the arm 46 is moved downwardly relative to the quadrant 52, the further down the ailerons 25—25 will be lowered, and the greater will be the angle of incidence of the wings. It will thus be evident that I have provided a variable control means for varying the angle of incidence of the wings of the plane through a contemporaneous movement of both ailerons. My novel arrangement permits of a multiple speed aeroplane without the necessity of accelerating the speed of the plane through the means of the power unit. In other words, I have provided means independent of the power unit of the plane for accelerating the movement of the plane. The ailerons may be returned to their normal positions by merely returning the arm 46 to its normal or vertical position. Of course, it must be borne in mind that even though the arm 46 is moved out of its normal or vertical position to another position, such as the dotted one shown in Figure 3 whereby the angle of incidence of the wings is increased, this in no way interferes with the banking of the wings inasmuch as the movement of the arm 46 has in no way affected the operation of the joy stick 20.

My novel control not only permits of an increased lift and take-off on the part of the plane, but also enables the plane to land with a considerably less speed than formerly. Despite the fact that the device of my invention is unusually simple in construction and in operation, it at the same time permits of a very fine and gradual control of the angle of incidence of the wings.

In Figures 5 and 6 I have illustrated a modification of the invention wherein the features of the invention are shown applied to a wheel type of control. The control includes a wheel 120 pivotally mounted upon a pin 121 rotatably carried by the upper end of a U-shaped bridge 122. Secured to one end of the pin 121 is an arm 123 disposed radially of the wheel 120. The upper end of this arm carries a resilient plunger 123' adapted to be seated in a hole 124' of the wheel 120 when the arm 123 is in its normal position. Attention is directed to the fact that the wheel is provided with a plurality of spaced openings 125', any one of which may be engaged by the plunger 123' carried by arm 123 depending upon the position to which arm 123 is moved. Secured to the other end of the pin or shaft 121 is a pulley 124. Positioned between the pulley 124 and the upper end of the bridge 122 is a second pulley 125 loosely mounted upon pin 121. It will be noted that the second pulley is rigidly secured to a sleeve 126 secured to wheel 120. This sleeve surrounds the pin 121 and extends through an opening 127 in the upper end of the U-shaped bridge 122.

The bridge 122 includes two spaced legs 129 and 130. The lower ends of these legs are pivotally mounted upon pins 131 and 132, respectively, carried by brackets 133 and 134 secured to the floorboard 35' of the cockpit.

The upper portion of the leg 129 has secured to it a pin 135 upon which is mounted a pair of pulleys 136. The lower portion of the leg 129 has secured to it a pin 137 upon which is rotatably mounted a pair of pulleys 138. Similarly the upper portion of leg 130 has secured to it a pin 139 upon which is mounted a pair of pulleys 140. The lower portion of the leg 130 has secured to it a pin 141 upon which is rotatably mounted a pair of pulleys 142. Secured to the pulley 125 which is connected to the wheel 120 for rotation therewith are the ends of two wire lines 54$^b$ and 60$^b$. These wires extend downwardly along the leg 129 of the control bridge 122 over the pulleys 136 and 138 and out along the left wing of the plane. The other end of the wire 60$^b$ is rigidly fastened to the upper side of the left aileron and the other end of the wire 54$^b$ is rigidly connected to the under side of the left aileron. Since the connections between these two wires of the aileron are substantially like the connections described in connection with the arms 28 and 29 of the preferred form of the invention, it is thought that no further description of these connections need be given.

Secured to the pulley 124 are the ends of two wide lines 54$^a$ and 60$^a$. These lines extend downwardly alongside of leg 130 of the control bridge 122 and over the pulleys 140 and 142 carried by this leg of the bridge. After leaving the pulleys 142, the two lines 54$^a$ and 60$^a$ are led outwardly through the right wing. The other end of the line 60$^a$ is rigidly connected to the upper side of the right aileron of the plane and the other end of the line 54$^a$ is rigidly connected to the under side of the right aileron.

The operation of this form of the invention is briefly as follows. Normally the arm 123 is connected to the wheel 120 for rotation therewith through the means of the plunger 123'. Obviously, therefore, if the wheel 120 is turned to the left, both pulleys 124 and 125 will be turned to the left, thus causing the lines 54$^b$ and 60$^a$ to be slackened and the lines 60$^b$ and 54$^a$ to be pulled. This means that the left aileron of the plane will be raised and the right aileron will be lowered, thus causing the left wing of the plane to be lowered and enabling the plane to be banked to the left. On the other hand, if the aviator desires to make a right turn, the wheel 120 will be turned to the right and a reverse operation to that above described will take place.

Now in the event that the aviator desires to increase the angle of incidence of the wings of the plane, he may do so by moving the arm 123 to the left as shown by the arrow in Figure 5, and by moving the wheel 120 to the right. In other words, the pulley 124 will be turned to the left and the pulley 125 will be turned to the right. This means that line 54$^a$ will be pulled and line 60$^a$ will be slackened, thus causing the right aileron to be lowered. Also the line 54$^b$ will be pulled and the line 60$^b$ will be slackened, thus causing the left aileron to be lowered. In other words, both of the ailerons will be contemporaneously lowered to increase the angle of incidence of these two wings. The degree to which these ailerons are lowered depends upon the amount of movement of the arm 123. The arm 123 may be held in the position to which it is moved by the plunger 123' thereof engaging in one of the openings 125' in the rim of the wheel 120. After the arm 123 has been thus locked to the wheel 120 with the ailerons in their lowered position, it is still possible to bank the plane by merely turning the wheel 120 and without the necessity of disturbing the position of the arm 123 relative to the wheel 120. The ailerons may be returned to their normal position by merely returning the arm 123 to its vertical position shown in Figure 5.

Now I desire it understood that although I have illustrated and described in detail the preferred forms of my invention, the invention is not to be thus limited, but only in so far as defined by the scope and spirit of the appended claims.

I claim as my invention:

1. In combination, in an aeroplane, a fuselage, wings connected to said fuselage, ailerons connected to said wings, and control means for operating said ailerons and adapted to cause said ailerons to be lowered to increase the angle of incidence of the wings, said control means including a joy stick pivotally mounted at its lower end, wiring between the joy stick and the ailerons of the plane adapted to be actuated by the joy stick to bank the plane, said wiring being connected to said joy stick on both sides of the pivot for said stick and an arm pivotally mounted on an intermediate portion of said joy stick including pulleys above and below the axis of its pivot, said wiring extending over said pulleys whereby said arm may be actuated independently of said stick to lower the ailerons and thus vary the angle of incidence of the wings.

2. In combination, in an aeroplane, a fuselage, wings connected to said fuselage, ailerons connected to said wings, and control means for operating said ailerons and adapted to cause said ailerons to be lowered to increase the angle of incidence of the wings, said control means including a joy stick pivotally mounted at its lower end, wiring between the joy stick and the ailerons of the plane adapted to be actuated by the joy stick to bank the plane, said wiring being connected to said joy stick on both sides of the pivot for said stick, an arm pivotally mounted on an intermediate portion of said joy stick including pulleys above and below the axis of its pivot, said wiring extending over said pulleys whereby said arm may be actuated independently of said stick to lower the ailerons and thus vary the angle of incidence of the wings, and means connected to said stick and cooperable with the end of said arm to maintain said arm in the position to which it is moved whereby said ailerons may be lowered to a plurality of different positions.

In testimony whereof I have hereunto subscribed my name at Chicago, Cook County, Illinois.

VICTOR V. MUZIK.